UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

MANUFACTURE OF REFRACTORY FURNACE-LININGS AND FIRE-BRICK.

SPECIFICATION forming part of Letters Patent No. 265,076, dated September 26, 1882.

Application filed August 23, 1882. (No specimens.)

*To all whom it may concern:*

Be it known that I, JAMES HENDERSON, of Bellefonte, Pennsylvania, (formerly of New York,) have invented a new and useful Improvement in the Manufacture of Furnace-Linings and Fire-Brick, of which the following is such full, clear, and exact description as will enable those skilled in the art to which this appertains to understand and carry on the same.

This invention relates to the hardening of the surface of furnace-linings and fire-brick by the application to the surface thereof of a hardening mixture, as hereinafter specified.

To the furnace-lining or fire-brick is applied a coating of a compound which will harden on exposure to the air or to heat. After the furnace-lining is made from a plastic compound and applied to a furnace, converter, or other metallurgic vessel it is coated with a mixture of glucose and water, mixed in the proportion of one part glucose to one and a half part water, by bulk. This mixture makes a thin liquid, as the glucose will in this proportion be dissolved in the water, and when applied to the absorbent or porous lining of the furnace it will be absorbed thereby, and when dried will hold it firmly together. Fire-brick may be coated on all sides with this mixture, or may be dipped into it and dried afterward; or they may be coated on one side only, if preferred. The mixture is preferably applied to the lining or brick when they are only partially dried either in the atmosphere or kilns. This hardening process is intended to be applied to brick or linings of fine sand or silica and other ingredients, which are described in several applications made by me for Letters Patent about this time, but it may be applied with good results to any brick or similar substance having a porous surface. The surface of brick or lining to which this mixture is applied and dried is found to be very much hardened thereby, and friable substances are made by the application of this mixture hard and firm. For the purposes of this mixture dextrine, starch, gum-arabic, mucilage, molasses, cellulose, or vegetable substances containing or from which sugar or starch may be derived, and which are soluble in water, are the equivalents of glucose, and may be substituted for it in about the same proportion—that is, as much may be added to the water as the water can dissolve. Less glucose will answer a good purpose, but not so well, as the stronger the binding agent the better it will answer the purpose for which it is used.

Wheat, rye, rice, or other grain, wood pulp, or other vegetable substance from which sugar or starch may be derived (in a finely-divided condition or made into flour and mixed with water to a thin paste) may be used for like purposes, but will not sink so far into the compound as when a soluble binding material is used. To the water used in making this mixture I may add slaked lime, magnesian-lime or magnesia, or fire-clay to make the water the consistency of milk, which will be found to greatly increase the binding quality of the mixture. When these substances are added to the mixture the mixture should not be put upon a surface of a compound containing a material with which the lime will form a fusible slag, or with which it will fuse, unless it is desired to make a glazed surface on the lining to which it is applied, in which case it may be accomplished by adding to the mixture a substance which will fuse with the compound to which it is applied when subjected to a high heat.

I do not claim the compound of the vegetable substances as specified and water with the material of the lining or brick, as that forms the subject-matter of other applications filed by me; nor do I claim the process of hardening the surface of like materials by coating them with solutions or binding liquids broadly, as silicates, together with glucose or saccharine matter, have been used to coat the surface of artificial stone heretofore and harden the same.

I claim as new and desire to secure by Letters Patent—

1. The process of hardening the surface of refractory linings or fire-brick, consisting of coating the surface thereof with a mixture of a vegetable binding agent and water and drying them, as specified and set forth.

2. The process of hardening the surface of refractory linings or fire-brick, consisting of coating the surface thereof with a mixture of glucose and water and drying them, as specified and set forth.

JAMES HENDERSON.

Witnesses:
H. H. BENNER,
D. M. STERN.